(12) United States Patent
Olaya et al.

(10) Patent No.: US 8,264,756 B2
(45) Date of Patent: Sep. 11, 2012

(54) DEVICE FOR RECORDING HOLOGRAMS

(75) Inventors: Jean-Christophe Olaya, Dresden (DE); Grigory Lazarev, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 401 days.

(21) Appl. No.: 12/394,722

(22) Filed: Feb. 27, 2009

(65) Prior Publication Data

US 2009/0225381 A1  Sep. 10, 2009

(30) Foreign Application Priority Data

Feb. 29, 2008  (DE) .......................... 10 2008 000 468

(51) Int. Cl.
*G02B 5/32* (2006.01)
*G03B 1/02* (2006.01)
*G03B 1/00* (2006.01)

(52) U.S. Cl. .............................. 359/21; 359/28; 359/30
(58) Field of Classification Search .................... 359/31, 359/21, 30
See application file for complete search history.

(56) References Cited

U.S. PATENT DOCUMENTS

| 6,753,990 | B1 | 6/2004 | Payne et al. |
| 7,057,580 | B1 * | 6/2006 | Ivanov ................................. 345/4 |
| 7,283,112 | B2 * | 10/2007 | Starkweather et al. .......... 345/84 |
| 2004/0184145 | A1 * | 9/2004 | Fridman et al. ................ 359/462 |
| 2004/0196524 | A1 | 10/2004 | Hughes et al. |

FOREIGN PATENT DOCUMENTS

JP   2005189626 A  *  7/2005

* cited by examiner

*Primary Examiner* — Jade R Chwasz
(74) *Attorney, Agent, or Firm* — Saul Ewing LLP

(57) ABSTRACT

An apparatus for recording holograms on an optical medium, in particular on an optically addressable spatial light modulation device is disclosed. For this purpose, the apparatus comprises an illumination device for emitting light, an optical medium, an image source having at least one modulation element, and an arrangement of microlenses. In this case, the arrangement of microlenses is arranged at a distance from the optical medium in such a way that the image focal points of the microlenses lie on the optical medium, such that the hologram can be generated on the optical medium.

19 Claims, 6 Drawing Sheets

DEVICE FOR RECORDING HOLOGRAMS

CROSS-REFERENCE TO RELATED APPLICATIONS

This application is based on and claims priority to German Application No. DE 10 2008 000468.5, filed Feb. 29, 2008, the entire contents of which are incorporated herein by reference.

FIELD OF THE INVENTION

The invention relates to an apparatus for recording holograms on an optical medium, in particular on an optically addressable spatial light modulation device, comprising an illumination device for emitting light, an optical medium, an image source having at least one modulation element, and an arrangement of microlenses, in order to represent, in particular three-dimensional scenes in high-resolution in particular for an observer. Furthermore, the invention also relates to a method for recording holograms.

BACKGROUND OF THE INVENTION

Holography makes it possible to record and subsequently reestablish the amplitude and phase distributions of a wavefront. In this case, an interference pattern of coherent light reflected from an object and light coming directly from a light source is recorded on a recording medium, e.g. a photographic plate. If the interference pattern, also referred to as a hologram, is illuminated with coherent light, a three-dimensional scene arises spatially. In order to generate the hologram by means of known methods or techniques, a real three-dimensional object is usually used, the hologram then being referred to as a genuine hologram. However, the hologram can also be a computer-generated hologram (CGH).

As reversible recording media for CGHs, use is made of light modulators, such as, for example, LCD (Liquid Crystal Display), LCoS (Liquid Crystal on Silicon), EASLM (Electrically Addressed Spatial Light Modulator), OASLM (Optically Addressed Spatial Light Modulator), which modulate the phase and/or the amplitude of incident light.

Electrically addressable spatial light modulators (EASLM) are very often used in reproduction devices or displays. In this case, an EASLM can be defined as a spatial light modulator which is constructed from discrete elements which are connected to an electrical circuit and are likewise driven via the latter. However, EASLMs for use in holographic reproduction devices for three-dimensional representation have considerable disadvantages, such as for example the limited number of modulation elements, also called pixels, the small filling factor and the relatively low resolution resulting therefrom.

In order that, however, a large three-dimensional scene can be offered, or a large observer region made possible for the observer, the EASLM must have a large number of modulation elements or pixels which are arranged very close together in order that a high filling factor can be achieved. In practice, however, this can only be achieved with high complexity and is associated with above average costs, with the result that good economic viability cannot be obtained.

Therefore, attempts have already been made to use optically addressable spatial light modulators (OASLM) for this purpose. An OASLM is a light modulator which can be used to generate an optically controllable change in the amplitude transparency and/or phase transparency. It has considerable advantages over an EASLM, particularly in the case of application in a reproduction device. The principal advantage resides in its analogue behaviour or in the fact that it is not pixelated. This means that there are no discrete pixels and therefore no filling factor and no sampling interval. Consequently the resolution of an OASLM is significantly higher than that of an EASLM. However, the problem resides in the addressing of an OASLM, that is to say in the recording of information or holograms thereon.

Various solutions have already been disclosed for recording a hologram on an optically addressable spatial light modulator. One solution is referred to as Active Tiling™ and is disclosed for example in U.S. Pat. No. 6,753,990 B1 or US 2004/0196524 A1. These documents describe for three-dimensional holographic representation the use of an electrically addressable spatial light modulator (EASLM) which is relatively small in terms of its size in conjunction with a relatively large optically addressable spatial light modulator (OASLM). In this case, holographic image data are displayed on the EASLM, said image data being sequentially focused by means of a microlens arrangement onto different regions or segments of the OASLM, and a hologram thus being written there. However, the OASLM is not written to directly and the hologram is not recorded directly, rather partial holograms are generated on the EASLM and transferred to the OASLM by means of the microlens arrangement.

However, new types of OASLM technologies, for example colour-doped OASLMs, expect a resolution of approximately 300 lp/mm to 1500 lp/mm and higher. With such a high resolution it is possible to generate holographically high-quality reconstructions in conjunction with large observer regions in comparison with the prior art to date. In order to use such an OASLM for the representation of three-dimensional scenes to be reconstructed, however it is necessary to write to the OASLM a hologram with correspondingly high resolution. It is necessary therefore for the OASLM to have regions or segments which are not larger than 3 μm, by way of example. However, the direct recording of a hologram on the OASLM is rather difficult with the aid of light sources, since the size of the light sources is generally larger than 10 μm and the total number of light sources required should not be too large. Furthermore, the recording of the hologram does not yield high-quality results with scanning systems or deflection systems, such as mirrors or prisms, in the case of a corresponding segment size of the OASLM, such that these solutions are likewise disadvantageous. Moreover, most of the systems existing hitherto can only be used for the current OASLM technology producing a resolution of 30 lp/mm to 100 lp/mm.

SUMMARY OF THE INVENTION

Therefore, it is an object of the present invention to provide an apparatus and a method for recording holograms on an optical medium, in particular on an optically addressable spatial light modulation device, with which the disadvantages mentioned above are avoided and with which a hologram can be written with high resolution.

The object is achieved with regard to the apparatus with the features of claim 1 and with regard to the method with the features of claim 19.

According to the invention, the object is achieved with regard to the apparatus by virtue of the fact that the arrangement of microlenses is arranged at a distance from the optical medium in such a way that the image focal points of the microlenses lie on the optical medium, such that the hologram can be generated on the optical medium.

In order to meet the high resolution of an optically addressable spatial light modulation device, designated hereinafter as OASLM, as optical medium, the hologram has to be recorded or written with high resolution. In order to make this possible, the apparatus according to the invention comprises microlenses or micro-objectives, which are mounted with respect to one another in such a way that they form an arrangement, such that the light is focused onto the OASLM in corresponding regions or segments. A microlens within the meaning of the invention is a lens whose diameter is principally in the millimeter range, in particular $\leq 1$ mm. The recording of the holographic structures or information in the image field of the individual microlenses is effected by means of the image source, which, by way of example, is advantageously embodied in reflective fashion and can therefore be an active mirror arrangement (MEMS) or else an arrangement of controllable prisms. It goes without saying that the image source can also be embodied in transmissive fashion. What is particularly advantageous in this case is the real-time addressing of the entire OASLM with a resolution that corresponds to that of the OASLM technology that is imminent in the near future, such as colour-doped OASLMs for example.

An apparatus of this type can be used to directly record or generate a hologram with high resolution on an optical medium. Moreover, the apparatus according to the invention permits the use of just a small number of elements, such as, for example, the number of modulation elements of the image source. For this purpose, the active mirror arrangement mentioned advantageously above as image source can have a low resolution without the resolution of the entire apparatus being decreased. Moreover, as a result of the direct recording of the hologram on the OASLM as preferred optical medium, the use of an EASLM, such as e.g. in U.S. Pat. No. 6,753,990, can be avoided and costs can thereby be considerably reduced. Moreover, the advantageously reflective embodiment of the image source affords the additional advantage of an overall apparatus which is compact in terms of its extent. As a result of the direct writing to the OASLM in real time, it is possible, in the case of use in a holographic reproduction device or display, as a result of the high resolution present, to observe large reconstructed scenes through a large observer window.

It can be particularly advantageous if each modulation element of the image source is assigned a microlens of the arrangement of microlenses. If the microlens used has a large field of view, then the number of microlenses of the arrangement which are to be used is small and, accordingly, so is the number of modulation elements of the image source. The image source can therefore have a low resolution without the resolution of the hologram that is to be written being reduced. As a result, a hologram can be generated on an optical medium, such as the OASLM, with low costs.

In one advantageous configuration of the invention, it can be provided that the illumination device has a light source in conjunction with a shutter which can be used to control the illumination on the image source. As a result, by switching on the in particular ferroelectric shutter, the illumination of the image source, in particular of the modulation elements of the image source, can be controlled in accordance with the required information with regard to the hologram, such that, depending on the information that can be written in, the required modulation elements of the image source are illuminated.

As an alternative, instead of one light source in conjunction with a shutter, it can also advantageously be provided that the illumination device has a multiplicity of light sources, the image source being able to be exposed depending on the driving of individual light sources. If a plurality of light sources are provided in the illumination device, then the modulation elements of the image source can be illuminated in accordance with the required information by the switching of the light sources. Consequently, a shutter is no longer necessary since the light sources perform this function.

In order to configure the apparatus according to the invention even more compactly, it can advantageously be provided that provision is made of at least one beam splitter element for guiding the light onto the image source. In this case, the beam splitter element can be arranged between the image source and the arrangement of microlenses in the light direction, with the result that the light is directed in the direction of the image source via the beam splitter element for the illumination of the modulation elements. In this way, an oblique arrangement of the illumination device with respect to the image source is avoided, whereby the illumination device can be arranged in space-saving fashion.

An alternative possibility thereto can consist in the fact that provision is made of an arrangement of a plurality of beam splitter elements in the beam path for guiding the light onto the image source, such that a respective beam splitter element of the arrangement is assigned to at least one modulation element of the image source.

In the case of this possibility of guiding the light onto the image source, it is advantageous if the beam splitter elements are embodied with such a different splitting ratio that the light impinging on the individual modulation elements of the image source has the same intensity. It can thereby be ensured that the same light intensity is present on all the modulation elements and the modulation elements are illuminated uniformly, with the result that no information is lost when recording the hologram in particular on the OASLM.

In a further advantageous configuration of the invention, it can be provided that for reading out the hologram from the optical medium an arrangement of a plurality of beam splitter elements is additionally provided, which is arranged between the arrangement of microlenses and the optical medium. In this way, it is possible to read out the hologram from the optical medium from the same side as it is recorded or written in. In other words: the read-out of the hologram is effected in transmission in comparison with the prior art. In order to minimize or avoid light losses in this case, the beam splitter elements can be embodied as polarization-sensitive beam splitter elements.

A further possibility of reading out the hologram in transmission or from the same side as it is written in can consist in the fact that for reading out the hologram from the optical medium an arrangement of organic light-emitting diodes is provided, which is arranged—in the light direction—upstream of the arrangement of microlenses, in particular in the object-side focal plane of the microlenses. In this way, too, the optical medium can be illuminated for reading out the hologram. An extended apparatus can be avoided here, for example if the optical medium is illuminated for read-out on the opposite side with respect to the side for writing in the hologram, whereby the apparatus can find application especially in devices that are limited in space.

It can be particularly advantageous if the organic light-emitting diodes are embodied as at least partly transmissive. Thus, they can already be arranged in the beam path during the recording of the hologram on the optical medium, without influencing the light impinging on the microlenses.

There can also be a major advantage if the microlenses are embodied as polarization-dependent or polarization-sensitive microlenses and have a birefringence such that light of a first polarization component can be influenced in terms of its wavefront and light of a second polarization component cannot be influenced in terms of its wavefront. By means of an apparatus according to the invention that is configured in this way, without additional elements such as, for example, beam splitter elements for reading out the hologram, the hologram can be recorded on the optical medium and also be read out again. This means that orthogonally polarized light is used for recording and reading out the hologram. However, the wavelengths used have to be different, which necessitates the use of, for example, two light sources and/or two illumination devices.

The object of the invention is furthermore achieved by means of a method for recording holograms on an optical medium, in particular on an optically addressable spatial light modulation device, light being guided from an illumination device onto at least one modulation element of an image source, which modulates the light by setting the at least one modulation element in accordance with the hologram to be recorded, wherein the light coming from the image source impinges on an arrangement of microlenses, which focuses the light onto the optical medium, whereby the hologram is generated on the optical medium.

In this way, a hologram is generated or written in directly on the optical medium, preferably an optically addressable spatial light modulation device (OASLM). In this case, the recording or writing-in of the hologram is effected in real time. By means of the method according to the invention, holograms can thus be written in directly to high-resolution optical media with a potential information density of 300-1500 lp/mm and higher.

Advantageously, non-coherent light is used for recording a hologram on the optical medium and sufficiently coherent light or light which is coherent in sufficiently large regions is used for reading out the hologram. In this case, however, the wavelengths must differ.

Further configurations of the invention emerge from the rest of the dependent claims. The principle of the invention is explained below on the basis of the exemplary embodiments described in greater detail in the figures.

DETAILED DESCRIPTION

The construction and the functioning of an apparatus for recording a hologram on an optical medium are described below. For this purpose, the optical medium is assumed to be an optically addressable spatial light modulation device, designated hereinafter as OASLM. In this case, the OASLM can be an OASLM already known from the prior art. These generally have, inter alia, a photosensitive layer, a light-absorbing layer, a reflective layer and a liquid crystal layer. Additional layers, such as glass layers, for example, can likewise be present. The construction of an OASLM is generally known and will not be presented any further here. It goes without saying that other high-resolution optically reversible media can also be used instead of the OASLM.

Figure 1:
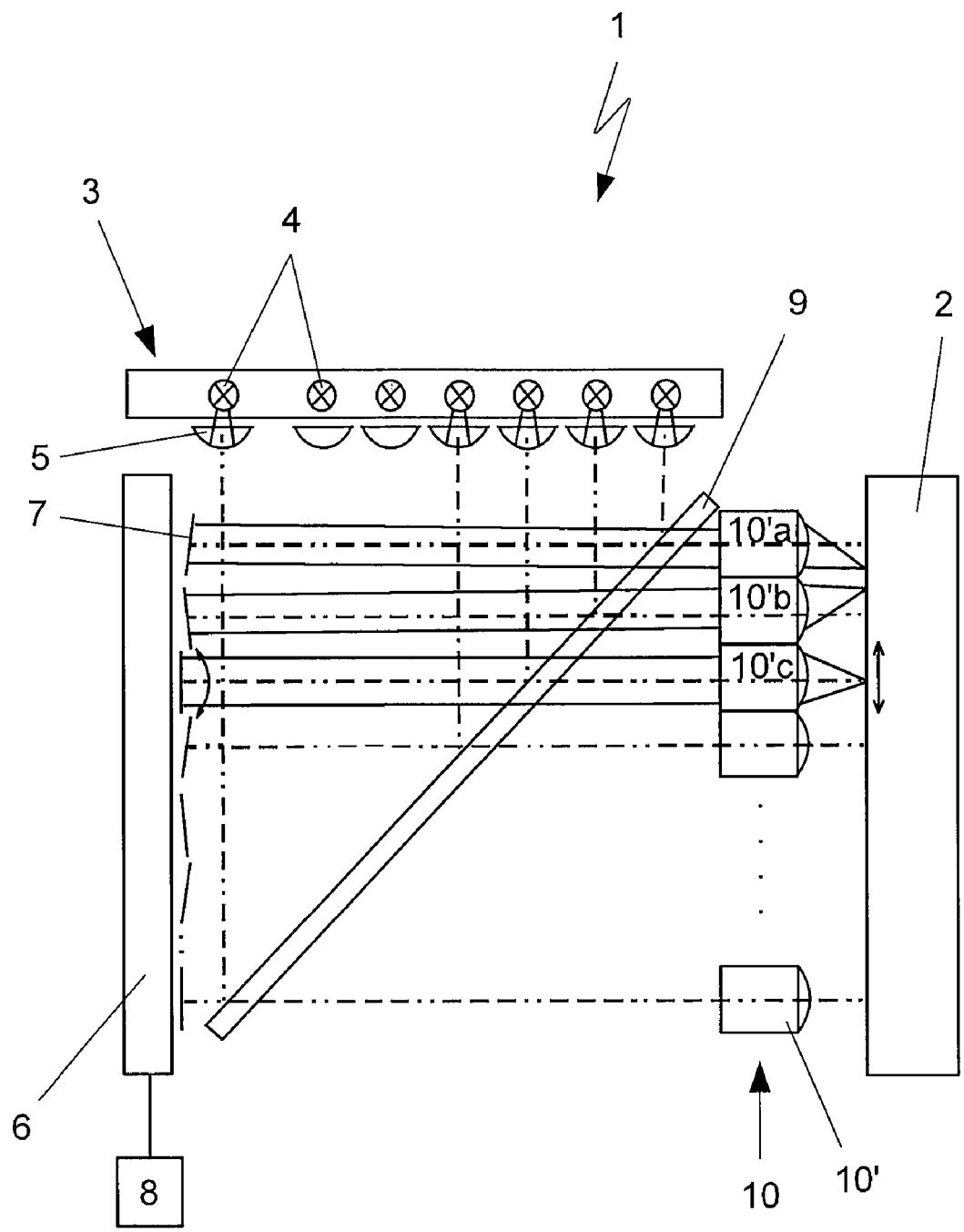
FIG. 1 shows a schematic view of a first embodiment of an apparatus according to the invention for recording holograms, in side view.

FIG. 1 illustrates a first embodiment of the basic construction of an apparatus 1, the apparatus 1 being shown in a very simplified fashion in side view. For directly recording or generating a hologram on the OASLM 2, the apparatus 1 comprises an illumination device 3, which in FIG. 1 comprises an arrangement of a plurality of light sources 4 which emit non-coherent light. The light sources used can be light-emitting diodes, for example, though it goes without saying that other light sources can also be used. For expanding and collimating the light emitted by the light sources 4 optical elements 5 are provided downstream of the light sources 4 in the light direction, the number of optical elements 5 corresponding to the number of light sources 4. In other words, there is arranged downstream of each light source 4 an optical element 5, for example a lens, for sufficiently collimating the emitted light. The sufficiently collimated light or the sufficiently collimated light beams are then directed onto an image source 6, which is advantageously embodied in two-dimensional fashion, though it goes without saying that the image source 6 can also be embodied in one-dimensional fashion. The image source 6 is embodied in reflective fashion here and has a plurality of modulation elements 7 in the form of micromirrors which are controlled for the modulation of the impinging light by means of a control device 8. It is also possible to use an image source embodied in transmissive fashion. Depending on the required hologram to be written in or recorded on the OASLM 2, the modulation elements 7 of the image source 6 can be correspondingly tilted and/or axially displaced. Alongside an arrangement of micromirrors as image source 6, it is also possible to provide an arrangement of variable prisms, the prism angle of which is controllable, or a deformable membrane mirror.

In this case, the light emitted by the light sources 4 is directed or guided onto the modulation elements 7 via a beam splitter element 9 extending over the entire image source 6, whereby the entire apparatus 1 can be configured more compactly.

After the modulation of the light, the latter is reflected in the direction of an arrangement of microlenses or micro-objectives 10, the light impinging on the individual microlenses 10' in collimated fashion. The number of microlenses 10' advantageously corresponds to the number of modulation elements 7 of the image source 6. In this case, the arrangement of microlenses 10 is arranged at a distance from the OASLM 2, such that the image focal points of the individual microlenses 10' lie on the OASLM 2. In this way, the light that has been modulated and reflected by each modulation element 7 can be focused onto the OASLM 2 by means of the corresponding microlens 10', whereby the holographic information or the hologram can be written in. Since each microlens or micro-objective 10' has a certain field of view (the size of the field of view is represented by means of an arrow in the OASLM 2), the writing-in region of the holographic information into the OASLM 2 can be defined by the field of view by means of tilting of the corresponding modulation element 7 (the tilting is intended to be shown on the basis of an arrow). This means that each microlens 10' can focus the light beam that impinges depending on the tilting of the modulation element 7 onto the OASLM 2 only in a region or segment predefined by the field of view. This principle of angle-to-linear conversion is shown very clearly in FIG. 1. By way of example, a first light beam is reflected at a specific angle and is then focused by a microlens 10'a below the optical axis of the microlens 10'a in the focal plane. A second light beam is reflected in a different direction with the result that a microlens 10'b focuses said beam above the optical axis into the focal plane. A third light beam, which impinges on a microlens 10'c parallel to the optical axis, is in this case focused by said microlens onto the optical axis in its focal point. Consequently, the focal point moves back and forth in a predetermined region on the OASLM 2 when the holographic information is written in. This in turn affords the advantage that with the use of microlenses 10' having a relatively large field of view, the number of required modulation elements 7 of the image source 6 can be smaller than in the case of microlenses 10' having a small field of view. For with a microlens 10' having a larger field of view it is therefore also possible to cover a larger region on the OASLM 2. The higher the required resolution of the optical assembly used for writing in the hologram must be, the smaller also its field of view is. However, it is always advantageously possible to use a low-resolution image source 6 for recording a high-resolution hologram in the OASLM 2.

Depending on how the hologram to be recorded on the OASLM 2 is defined, the light sources 4 of the illumination device 3 are switched on such that light is directed only onto some or onto all of the modulation elements 7 and with this light the corresponding holographic information is then directly written in the OASLM 2. With a setting pattern of the modulation elements 7 only a small region of the OASLM 2 is written to. In order that a complete hologram can be generated, the modulation elements 7 have to be controlled multiply, such that holographic information can be completely written to the OASLM 2. If only a region of the OASLM 2 which corresponds to the field of view of a microlens 10' is written to completely, then this region can be e.g. a subhologram. It can also be possible, of course, that a complete hologram is written in a region corresponding to the field of view of a microlens 10'. An efficient amplitude modulation or phase modulation of the OASLM 2 can be achieved by intensity modulation of the light sources 4.

Figure 2:
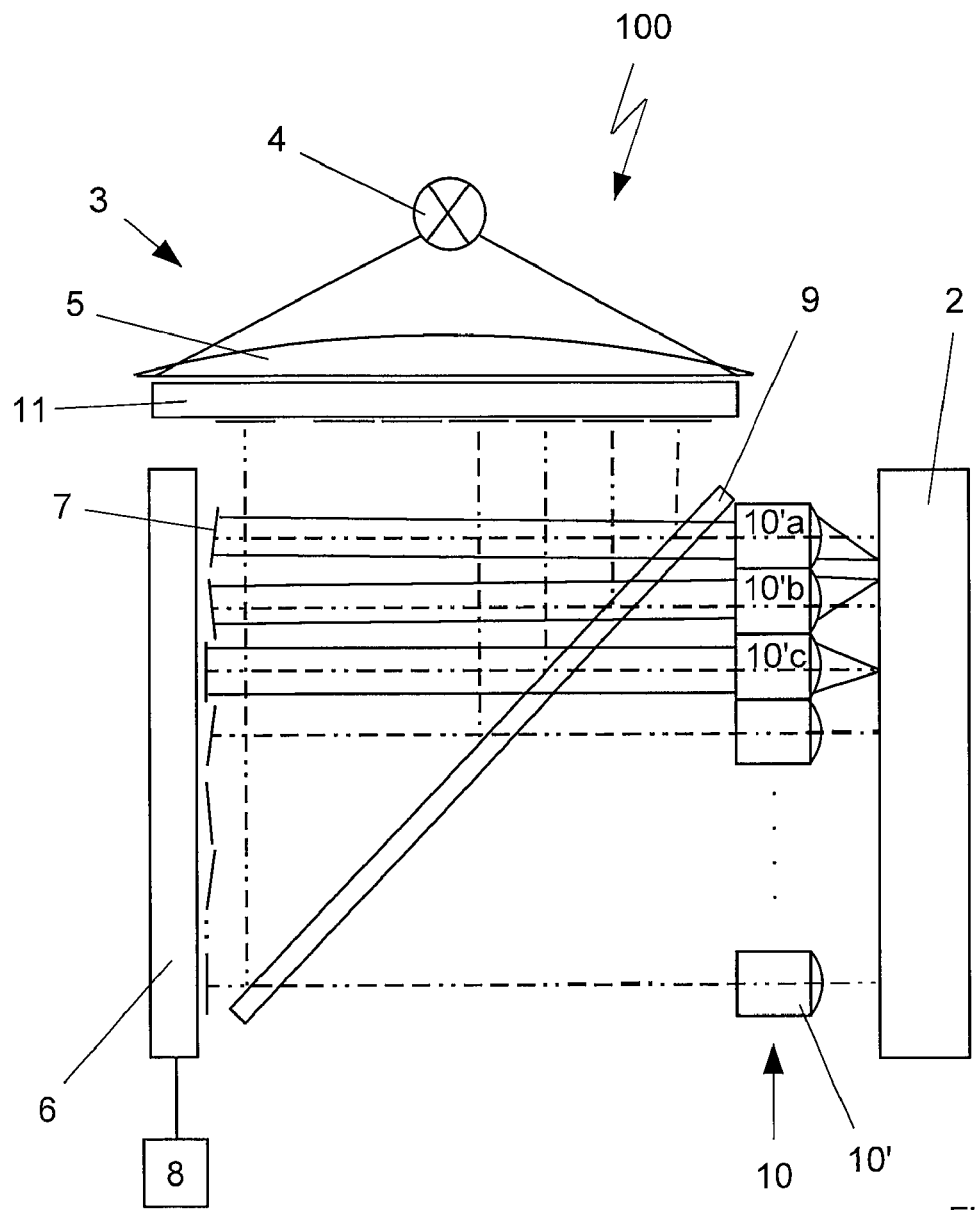
FIG. 2 shows a schematic view of a second embodiment of the apparatus according to the invention, in side view.

An alternative embodiment is shown by the apparatus 100 in FIG. 2. In this case, identical parts from FIG. 1 also have the same reference symbols. In contrast to FIG. 1, here the illumination device 3 has only one light source 4, which can advantageously be embodied as a light-emitting diode. This light source 4 is also assigned only one optical element 5 for expanding or collimating the light. In order that light also impinges only, if required, on specific modulation elements 7 of the image source 6, a shutter 11, in particular a ferroelectric shutter, is arranged downstream of the optical element 5 in the light direction, said shutter being switched on depending on the modulation element 7 to be activated. In other words, if light is not intended to impinge on all the modulation elements 7, the shutter 11 is controlled and switched in such a way that only some shutter openings transmit light, with the result that light also impinges only on some modulation elements 7 and microlenses 10'. The principle of directly recording a hologram on the OASLM 2 is effected here in the manner already described with respect to FIG. 1.

Figure 3:
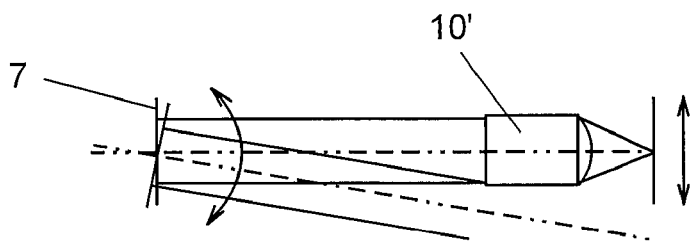
FIG. 3 shows a section of the apparatus in accordance with FIG. 1 or FIG. 2 for illustrating the illumination of a microlens.

In addition or else as an alternative to the use of the shutter 11, it is possible to influence the illumination of the microlenses 10'. In this respect, FIG. 3 shows only an excerpt from the apparatus 100, where a modulation element 7 in conjunction with an assigned microlens 10' is illustrated. The illumination on the microlens 10' can be influenced in such a way that if illumination of the microlens 10' is not desired, the corresponding modulation element 7 is tilted (as represented by the arrow) in such a way that the modulation element 7 reflects the light to outside the aperture of the microlens 10'. In this case, care should be taken to ensure that this reflected light does not impinge on adjacent microlenses 10' and thereby distort the holographic information.

Figure 4:
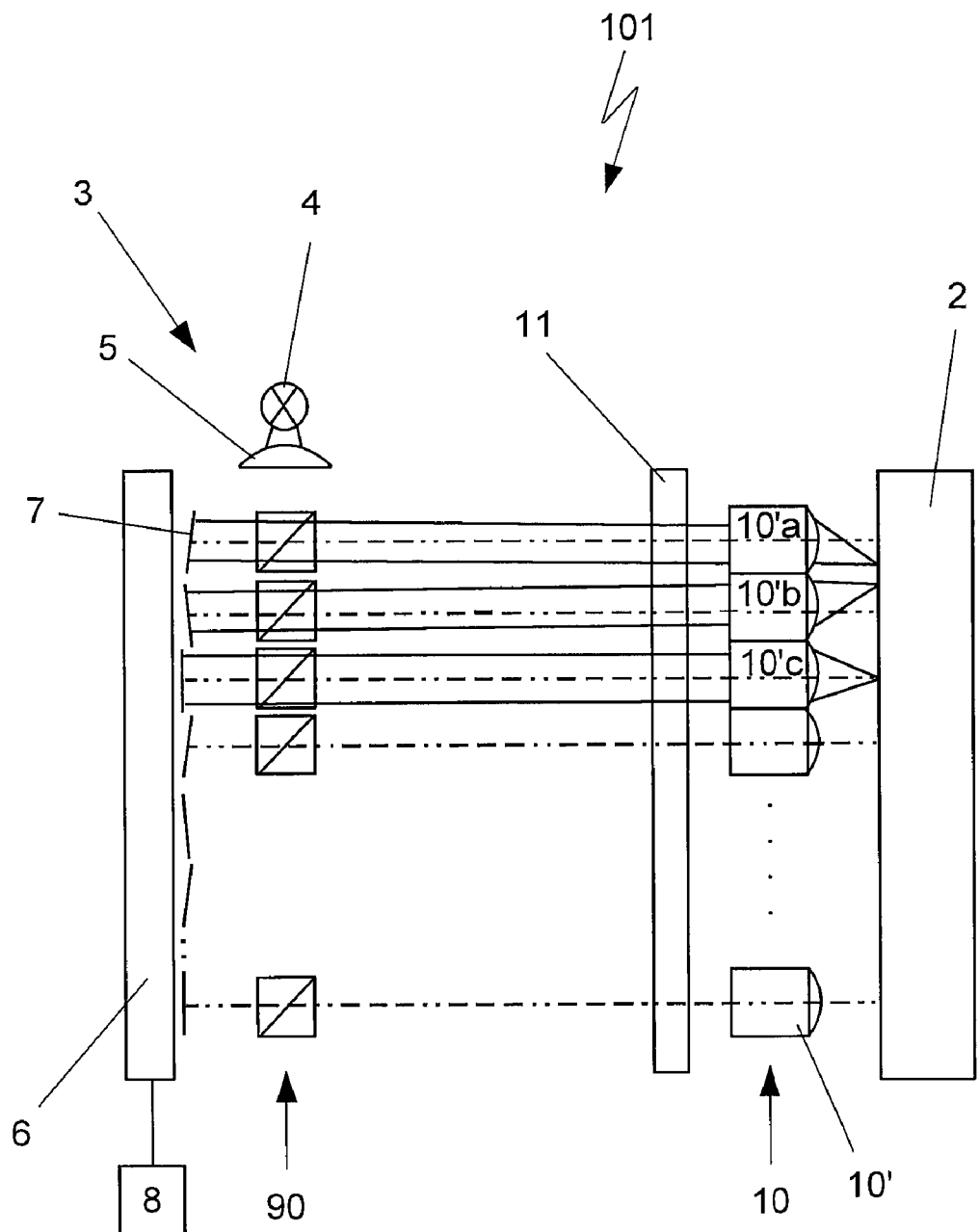
FIG. 4 shows a schematic view of a third embodiment of the apparatus according to the invention, in side view.

FIG. 4 shows a further embodiment in the form of the apparatus 101, here as well identical parts again having identical reference symbols. Instead of a beam splitter element running over the entire image source 6, provision is made of an arrangement of a plurality of beam splitter elements 90 in the beam path for guiding the light onto the modulation elements 7 of the image source 6, such that a respective beam splitter element is assigned to at least one modulation element 7. That is to say that a beam splitter element is assigned to each modulation element 7 of the image source 6 or only to each one-dimensional arrangement of modulation elements 7 of the image source 6. It follows from the latter that the beam splitter element is not embodied as a beam splitter cube, for example, but rather as a beam splitter bar. In this case, the individual beam splitter bars or beam splitter cubes can be arranged horizontally one above another and/or vertically one behind another, depending on the arrangement of the illumination device 3. In this way, a beam splitter bar then extends over an entire column or row of modulation elements 7. Smaller beam splitter bars which extend only over a specific number of modulation elements in each case are also conceivable. In order that all modulation elements 7 of the image source 6 are illuminated uniformly with light of the same intensity and consequently without loss of light, care must be taken to ensure that the beam splitter elements have a correspondingly different splitting ratio provided for this purpose, or different reflectances. If the beam splitter elements are embodied as beam splitter bars, then it is sufficient for one light source 4 to be provided for illuminating the modulation elements 7. However, if the beam splitter elements are embodied as beam splitter cubes, then it is provided that each column or row, depending on the arrangement of the illumination device 3 with respect thereto, is illuminated by a light source 4. Consequently, a multiplicity of light sources 4 are to be provided in the case of the illumination of an image source 6 embodied in two-dimensional fashion.

The light from the light source(s) 4 is in turn sufficiently collimated by means of the optical element(s) 5 and then impinges on the row of a plurality of beam splitter elements or beam splitter cubes which faces the optical element(s) 5, or on a beam splitter bar of the arrangement 90. The arrangement of a plurality of beam splitter elements 90 then guides the light onto the modulation elements 7, from where it impinges on the arrangement of microlenses 10 after reflection. In order that light, if required, impinges only on desired microlenses 10', the shutter 11 described with respect to FIG. 2 can advantageously be arranged upstream of the arrangement of microlenses 10 in the light direction, here between the beam splitter elements and the microlenses 10'. If one beam splitter element is provided per modulation element 7, then it is also possible to use a plurality of light sources 4 which, depending on the arrangement of the light sources 4, illuminate a column or a row of modulation elements 7 by means of the beam splitter elements.

Figure 5:
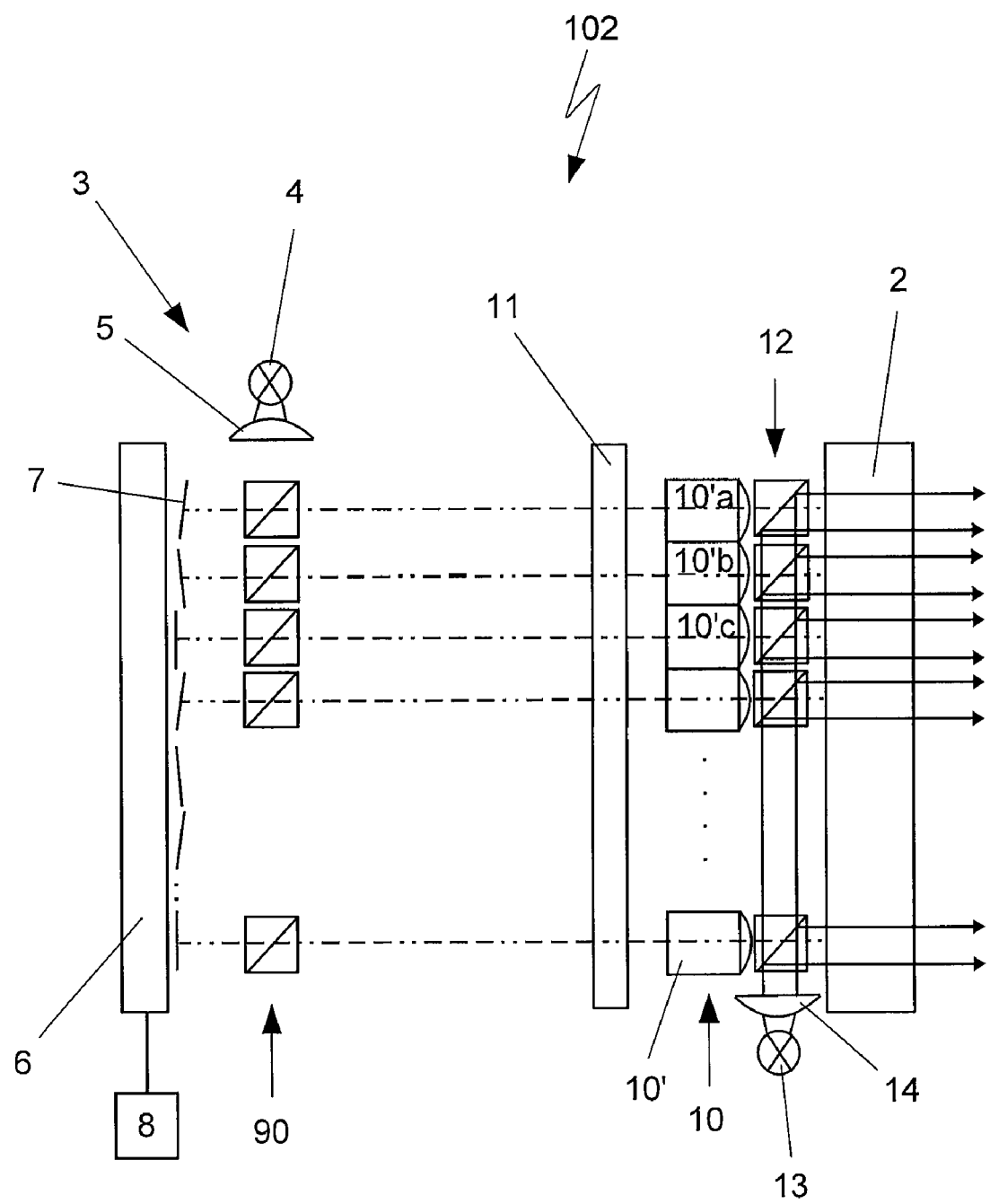
FIG. 5 shows a schematic view of the apparatus according to the invention for recording a hologram with a first possibility of the reading-out of the hologram, in side view.

FIG. 5 illustrates the apparatus 101 from FIG. 4, in which case, in addition to the recording, a possibility of reading out the hologram from the OASLM 2 is shown and the apparatus 102 is thus formed. In FIG. 5, the read-out is effected from the same side of the OALSM 2 as the writing-in or recording of the hologram. The problem in the case of this procedure is that it is virtually impossible to illuminate the OASLM 2 with collimated light over the whole area by means of for example the beam splitter element in accordance with FIG. 1 or 2 since this light, although it is collimated, has to pass through the arrangement of microlenses 10. The microlenses 10' would accordingly focus this light, such that the OASLM 2 is not illuminated areally. Light beams converging onto the microlenses 10' would also define only a small aperture diameter upon impingement, with the result that the region illuminated on the OASLM 2 is likewise small. In order to avoid such disadvantages, an arrangement of a plurality of beam splitter elements 12 is additionally provided for illuminating the OASLM 2 and therefore for reading out the hologram, said arrangement being arranged between the arrangement of microlenses 10 and the OASLM 2. In this case, each region or segment on the OASLM 2 which is defined by means of the field of view of a microlens 10' is assigned a beam splitter element of the arrangement 12 in order that these regions or segments of the OASLM 2 can also be illuminated over the whole area for the purpose of reading out the hologram. This again means here, too, that the individual beam splitter elements of the arrangement 12 are arranged horizontally one above another and vertically alongside one another. Each column or row of the arrangement of beam splitter elements 12 is illuminated by a light source which emits sufficiently coherent light. In order that virtually no light losses occur in the course of light passing through the individual beam splitter elements of the arrangement 12, the individual beam splitter elements should have a correspondingly different splitting ratio or different reflectances in this case, too. Since, moreover, the arrangement of beam splitter elements 12 is already arranged in the beam path of the apparatus 102 during the recording of the hologram, they must not adversely influence the light focused onto the OASLM 2 by the microlenses 10' during recording. Therefore, polarization-sensitive beam splitter elements can advantageously be arranged between the microlenses 10' and the OASLM 2. Such a beam splitter element, expressed in general terms, has two prisms having different refractive indices for horizontally and vertically polarized light. This means that light in one polarization direction is transmitted and light in the other polarization direction is refracted. In this case, care should be taken to ensure that light of different wavelengths is used for the recording and the read-out of the hologram. What can be achieved in this way is that the direction of the light reflected by the modulation elements 7 of the image source is not influenced by the beam splitter elements and the light guided from a light source 13 via an optical element 14 onto the beam splitter elements is reflected towards the OASLM 2. By way of example, one prism can have a higher refractive index for the horizontal polarization direction, such that this light beam experiences total internal reflection and leaves the beam splitter element on a different path from the vertically polarized light beam.

Figure 6:
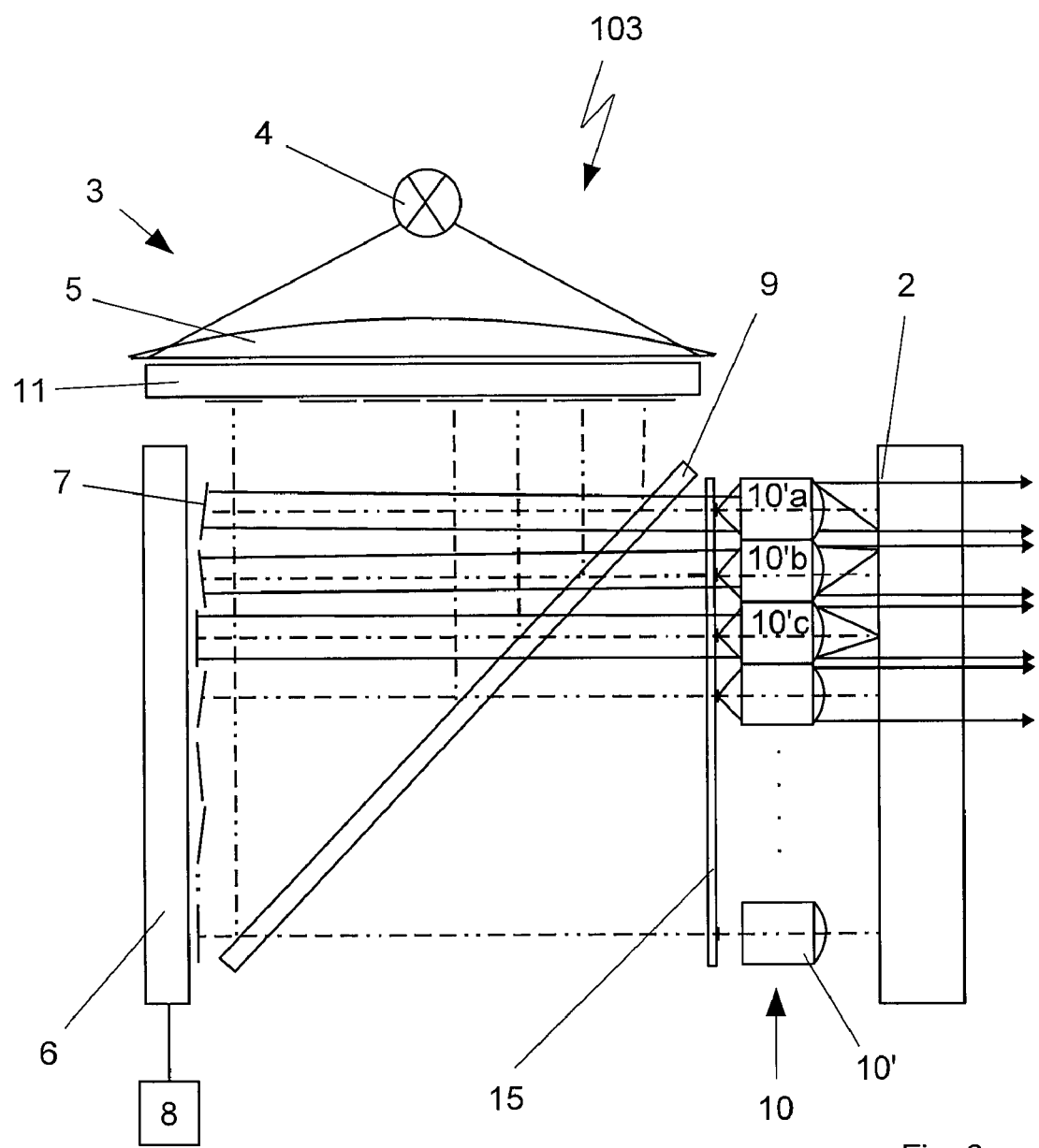
FIG. 6 shows a schematic view of the apparatus according to the invention with a second possibility of the reading-out of the hologram, in side view.

A further possibility of reading out the hologram is illustrated in FIG. 6, the basic construction of the apparatus 103 corresponding to that in FIG. 2. The writing-in of the hologram is effected in the manner already described with respect to FIG. 1 or FIG. 2. Here likewise as in FIG. 5 the read-out of the hologram is effected from the side from which the hologram is already written to the OASLM 2. Instead of the arrangement of a plurality of beam splitter elements 12 in accordance with FIG. 5, here a light source arrangement, here an arrangement of organic light-emitting diodes 15 (OLED), is provided, which is arranged upstream of the arrangement of microlenses 10 in the light direction since a direct positioning of the arrangement of organic light-emitting diodes 15 in the plane of the OASLM 2 does not obtain the required effect, owing to the spatial incoherence of such light sources. It is particularly advantageous if the arrangement of organic light-emitting diodes 15 is arranged in the object-side focal plane of the microlenses 10', as illustrated in FIG. 6. In this way, the OASLM 2 can be illuminated with sufficiently collimated light and the hologram can be read out completely. Since organic light-emitting diodes only contain a certain coherence, however, for reading out the hologram organic light-emitting diodes with a correspondingly high degree of coherence should be chosen, such that enough sufficiently coherent light for read-out impinges in the region of the subholograms or on the segments of the OASLM 2. Here, too, light of different wavelengths is used for recording and reading out the hologram.

Since the arrangement of organic light-emitting diodes 15 is already arranged in the beam path of the apparatus 103 when the hologram is recorded on the OASLM 2, care should be taken to ensure that the organic light-emitting diodes are embodied as at least partly transmissive, in order that, during the recording of the hologram, the light reflected by the modulation elements 7 of the image source 6 is not vignetted or adversely influenced, with the result that an optimum recording of the hologram is ensured. The organic light-emitting diodes are self-luminous and are distinguished by a low power requirement. Moreover, they are extremely flat, whereby the apparatus 103 is not unnecessarily extended in its size. By virtue of the furthermore very short reaction times or response times in the ms range, they consequently serve as an optimum light source for illuminating the OASLM 2. It is also possible to pivot the arrangement of organic light-emitting diodes 15 into the beam path after the recording of the hologram on the OASLM 2.

Figure 7:
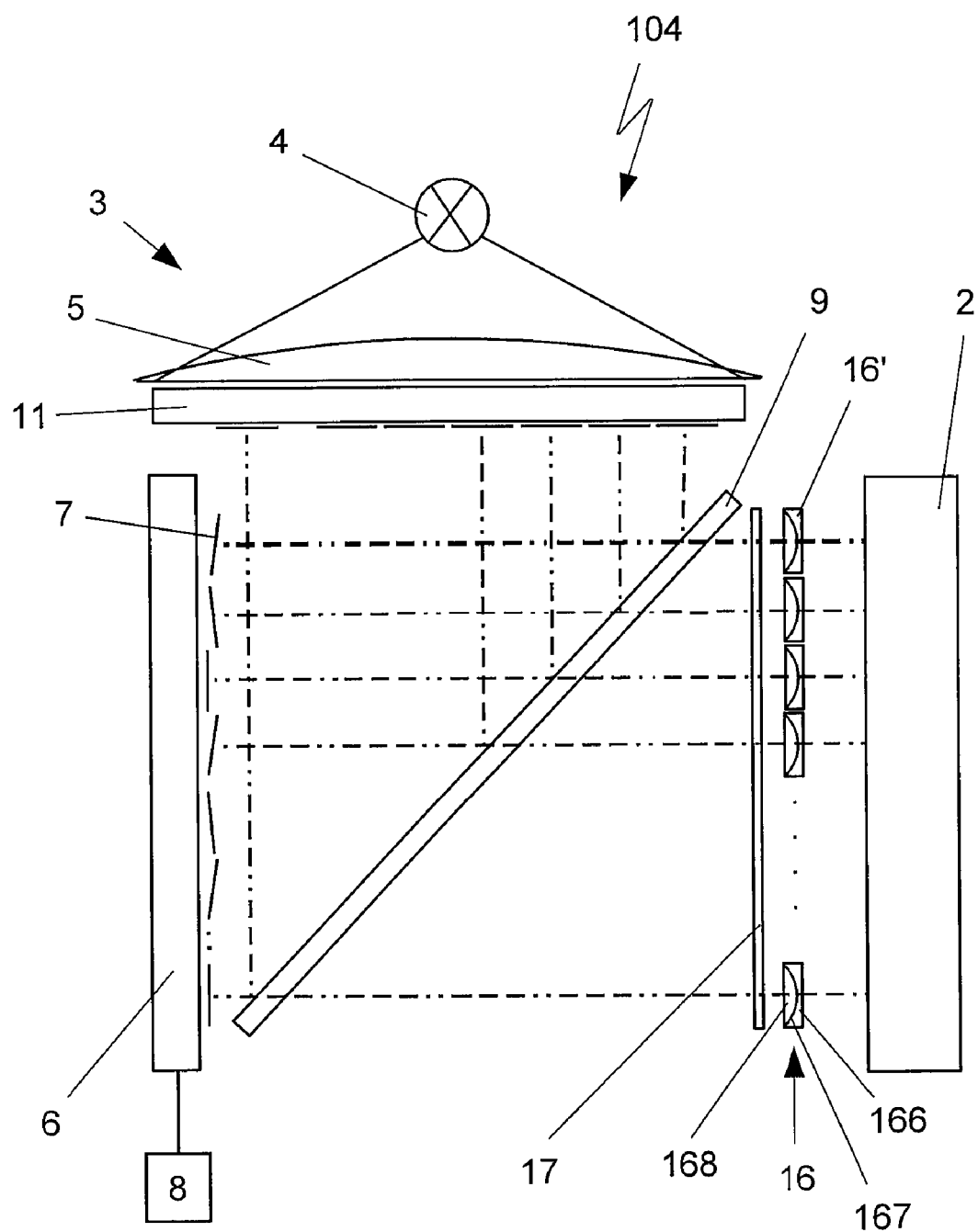
FIG. 7 shows a schematic view of the apparatus according to the invention with a third possibility of the reading-out of the hologram, in side view.

Alongside the possibilities already described above, the recording and read-out of a hologram in and from the OASLM 2 can also be effected by means of the apparatus 104 illustrated in FIG. 7. Here, too, the basic construction corresponds to that in FIG. 2, though here an arrangement of microlenses 16 is provided. The microlenses of the arrangement 16 are embodied as polarization-dependent or polarization-sensitive microlenses 16'. In this case, the individual polarization-dependent microlenses 16' have a birefringence such that, in general, light of a first polarization component is directed in a first direction and light of a second polarization component is directed in second direction, which differs from the first direction, or, in the present case, the light of a first polarization component is influenced in terms of its wavefront and light of a second polarization component is not influenced in terms of its wavefront. In this case, at least two light sources are used which emit light of different wavelengths and have two polarization directions. This means that orthogonally polarized light is used for recording and reading out the hologram. For this purpose, each individual polarization-dependent microlens 16' is constructed approximately as follows. A substrate (not illustrated) is provided with an isotropic material 166, on which a microstructured interface 167 is formed. A birefringent material 168 having a defined birefringent optical axis direction is applied on the microstructured interface 167. A further substrate (not illustrated) is applied to the birefringent material 168 in order to enclose the latter. It goes without saying that modifications of the embodiment of the polarization-dependent microlenses 16' are possible.

Moreover, a switchable polarizer 17 is arranged upstream of the polarization-dependent microlenses 16' in the light direction, which polarizer can switch between a first polarization state, which transmits light of the first polarization component, and a second polarization state, which transmits light of the second polarization component. Such polarizers 17 are generally known and will therefore not be described in any further detail. For recording the hologram on the OASLM 2, the polarizer 17 is switched into a first polarization state, such that the microstructured interface 167 acts as a lens and thus focuses the light reflected by the modulation elements 7 of the image source 6 into a region on the OASLM 2. For reading out the hologram from the OASLM 2, the polarizer 17 is then switched into a second polarization state, whereby the microstructured interface 167 has or exhibits essentially no optical effect, with the result that the polarization-dependent microlens 16' acts as a simple plane plate. The light thus impinging on the polarization-dependent microlens 16' is thereupon not influenced in terms of its light direction and therefore remains sufficiently collimated. This collimated light then impinges areally on the region defined by the field of view of the polarization-dependent microlens 16' or on the segment of the OASLM 2 that is defined by the field of view.

In all the embodiments illustrated in FIGS. 1 to 7, however, care should be taken to ensure that light of different wavelengths is used for recording and for reading out the hologram, in order to prevent the light during recording and read-out from being able to influence one another and the information from thereby being destroyed.

For all the embodiments of the apparatus according to the invention which are illustrated in FIGS. 1 to 7 it holds true that non-coherent light is used for directly recording a hologram on the OASLM 2 and coherent or sufficiently coherent light is used for reading out the hologram. The hologram can also be read out from the opposite side of the OASLM 2 with respect to the writing-in side, as described for example in US 2004/0196524 A1. In this case, the recording and also the read-out of the hologram are advantageously effected in real time. The illumination of the modulation elements 7 of the image source 6 can also be effected, of course, without the use of the beam splitter element 9 or a plurality of beam splitter elements 90, in which case the arrangement of the light source or light sources 4 of the illumination device 3 or the illumination device 3 per se then has to be performed accordingly, for example at an angle with respect to the image source 6.

Should it be necessary for the hologram to be read out from the OASLM 2 in coloured fashion, then it is possible to provide for example three light sources corresponding to the primary colours red, green and blue instead of a monochromatic light source 4 in the apparatuses 102, 103 and 104. If a plurality of monochromatic light sources 4 are provided in the apparatuses 102, 103 and 104, then these must correspondingly be replaced by a plurality of light sources of the primary colours. The coloured read-out of the hologram can thereupon be effected simultaneously or sequentially.

It goes without saying, however, that further embodiments of the apparatus, FIGS. 1 to 7 only representing preferred embodiments, are possible. Modifications of the embodiments shown are possible, therefore, without departing from the scope of the invention.

As a result of the recording and read-out of the hologram in real time, the apparatus 1, 100, 101, 102, 103, 104 can be used particularly advantageously in holographic reproduction devices for the reconstruction of advantageously three-dimensional scenes. Since the hologram is written into the OASLM 2 with a high resolution, it is then possible to generate high-quality reconstructions. In addition, these reconstructions can then be observed advantageously three-dimensionally by means of a large observer window. The observer can thus observe the reconstructions with both eyes.

Possible fields of use for the apparatus 1, 100, 101, 102, 103, 104 can be displays for a two- and/or three-dimensional representation for the private and work sectors, such as, for example, for computers, television, electronic games, automotive industry for displaying information or entertainment, medical technology, here in particular for minimally invasive surgery or the spatial representation of data obtained by tomography, or else for military technology, for example for representing terrain profiles. It goes without saying that the present apparatus 1, 100, 101, 102, 103, 104 can also be used in other areas that have not been mentioned here.

We claim:

1. An apparatus for recording holograms on an optical medium comprising
    an illumination device for emitting light;
    an optical medium;
    an image source having at least one modulation element; and
    an arrangement of microlenses, each of the microlenses comprising a field of view wherein a hologram can be generated,
        wherein the image source comprises a plurality of modulation elements embodied as controllable micromirrors or prisms, wherein the arrangement of microlenses is located between the image source and the optical medium and is arranged at a distance from the optical medium in such a way that image focal points of the microlenses lie on the optical medium, wherein each modulation element of the image source is assigned a single microlens of the arrangement of microlenses such that the hologram can be generated on the optical medium by angle-to-linear-conversion within regions of the optical medium which correspond to the field of view of the microlenses.

2. The apparatus according to claim 1, wherein the image source is embodied in reflective fashion.

3. The apparatus according to claim 1, wherein the modulation elements of the image source are controllable for modulation of the light by means of a control device.

4. The apparatus according to claim 1, wherein the illumination device comprises a light source in conjunction with a shutter which can be used to control the illumination on the image source.

5. The apparatus according to claim 4, wherein for a collimation of the light emitted by the light source, optical elements are provided which are arranged downstream of shutter openings of the shutter in the light direction.

6. The apparatus according to claim 1, wherein the illumination device comprises a multiplicity of light sources, the image source being able to be exposed depending on a driving of individual light sources.

7. The apparatus according to claim 6, wherein for a collimation of the light emitted by the light sources, in accordance with the number of light sources optical elements are provided which are arranged between the light sources and the image source.

8. The apparatus according to claim 1, wherein provision is made of at least one beam splitter element in the beam path for guiding the light onto the image source or in that provision is made of an arrangement of a plurality of beam splitter elements in the beam path for guiding the light onto the image source, such that a respective beam splitter element of the arrangement is assigned to at least one modulation element of the image source.

9. The apparatus according to claim 8, wherein the beam splitter elements are embodied with such a different splitting ratio that the light impinging on the individual modulation elements of the image source has the same intensity.

10. The apparatus according to claim 1, wherein for reading out the hologram from the optical medium, a light source arrangement, in particular an arrangement of organic light-emitting diodes, is provided, which is arranged—in the light direction—upstream of the arrangement of microlenses, in particular in the object focal plane of the microlenses.

11. The apparatus according to claim 1, wherein the microlenses are embodied as polarization-dependent microlenses and have a birefringence such that light of a first polarization component can be influenced in terms of its wavefront and light of a second polarization component cannot be influenced in terms of its wavefront.

12. The apparatus according to claim 11, wherein a switchable polarizer is provided, which can be switched between a first polarization state, which transmits light of the first polarization component, and a second polarization state, which transmits light of the second polarization component.

13. The apparatus according to claim 1, wherein the optical medium is an optically addressable spatial light modulator device.

14. The apparatus according to claim 1, wherein the arrangement of microlenses is illuminated by collimated light.

15. A method for recording holograms on an optical medium, light being guided from an illumination device onto a plurality of modulation elements embodied as controllable micromirrors or prisms of an image source, which modulates the light by setting the modulation elements in accordance with the hologram to be recorded, said light coming from the image source incidents on an arrangement of microlenses, which focuses the light into image focal points onto the optical medium, whereby the hologram is generated on the optical medium within regions of the optical medium which correspond to a field of view of the microlenses in dependence of the controllable micromirrors or prisms such that each modulation element is assigned to a single microlens to achieve angle-to-linear-conversion.

16. The method according to claim 15, wherein a multiplicity of modulation elements of the image source are controlled by means of a control device in such a way that the modulation elements guide the impinging light to the microlenses assigned to the modulation elements in such a way that each microlens focuses the impinging light into a predefined region onto the optical medium.

17. The method according to claim 15, wherein orthogonally polarized light is used for recording and for reading out the hologram from the optical medium.

18. The method according to claim 15, wherein non-coherent light is used for recording a hologram on the optical medium and sufficiently coherent light is used for reading out the hologram.

19. The method according to claim 15, wherein collimated light incidents on the image source and on the arrangement of microlenses.

* * * * *